Aug. 7, 1934.  H. KRÄMER ET AL  1,969,408
CAR LIFTING DEVICE
Filed Nov. 19, 1932   2 Sheets-Sheet 1
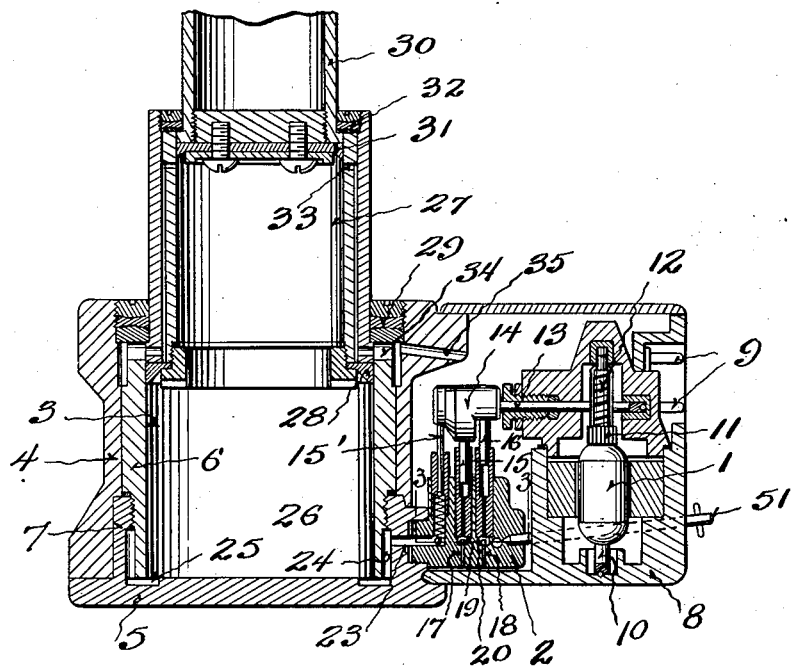
Fig. 1.
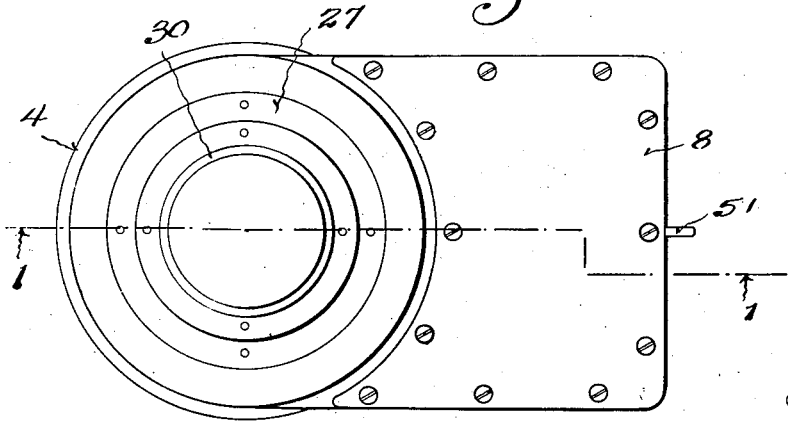
Fig. 2.
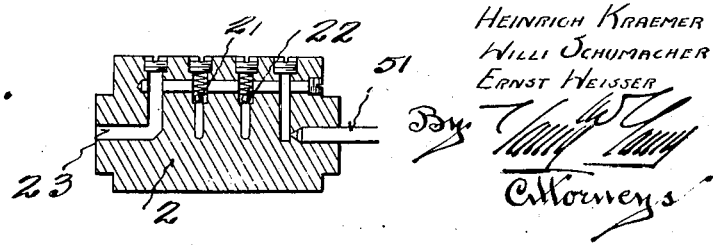
Fig. 3.
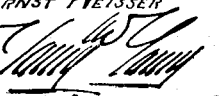
Inventors
HEINRICH KRAEMER
WILLI SCHUMACHER
ERNST HEISSER
By
Attorneys Aug. 7, 1934.  H. KRÄMER ET AL  1,969,408
CAR LIFTING DEVICE
Filed Nov. 19, 1932  2 Sheets-Sheet 2
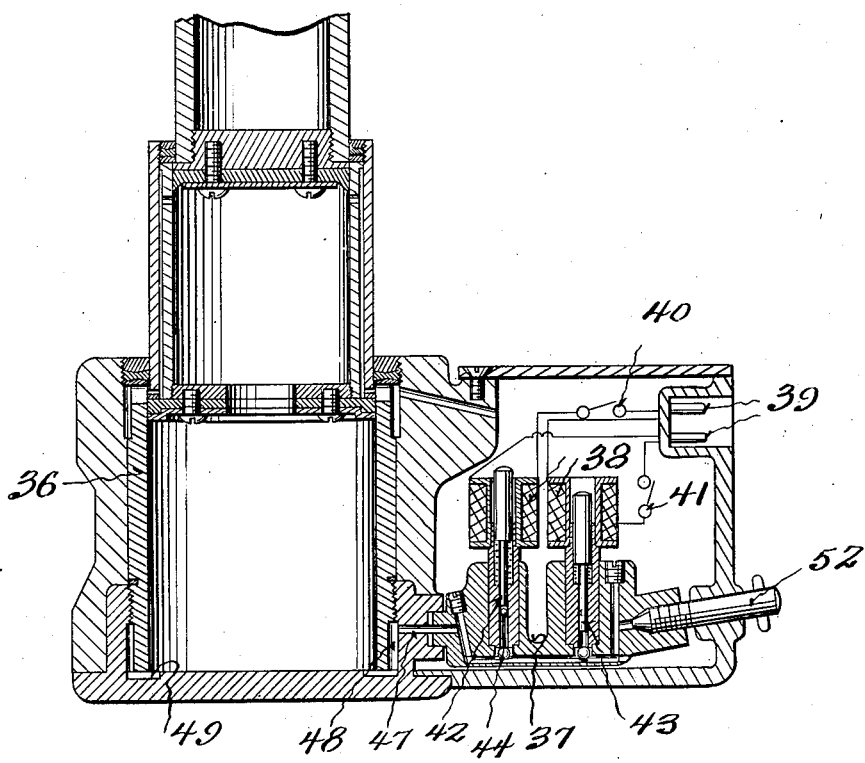
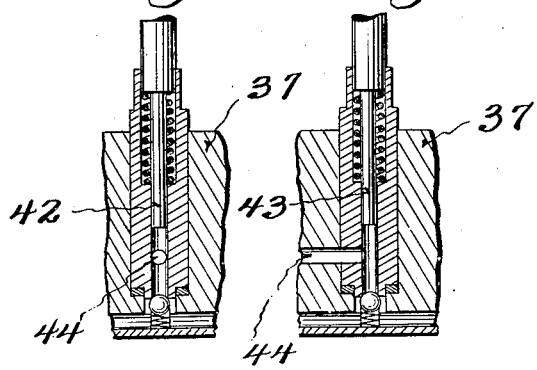

Patented Aug. 7, 1934

1,969,408

UNITED STATES PATENT OFFICE 1,969,408

CAR LIFTING DEVICE

Heinrich Krämer, Willi Schumacher, and Ernst Weisser, Hornberg, Germany, assignors, by mesne assignments, of one-third to Beece Corporation, Inc., Milwaukee, Wis., a corporation of Delaware Application November 19, 1932, Serial No. 643,370
In Germany February 1, 1932

1 Claim. (Cl. 138—9)

This invention relates to electro-hydraulic car lifting devices.

The known constructions of car jacks suffer from the drawback that they are too complicated in design and therefore too expensive, and that their parts are arranged so that the overall height of the device when in inoperative position exceeds the space available between the ground and the axles for installing the jack.

The invention eliminates these drawbacks by providing a car lifting device comprising three units which can be manufactured independently from one another, viz. the carrier of the telescopic pipes, the pump body with piston and valves, and the driving motor. According to the invention, the pump body and the electric motor are installed in a common casing connected with the carrier of the telescopic pipes. The pressure piping of the pump is connected with the telescopic space by a vertical duct communicating at its lowest point with horizontal channels or one undivided horizontal annular channel, the channels being arranged in the base plate supporting the telescopic pipes. The base plate is provided with a cylindrical projection which enters between the inner bushing and the casing receiving the telescopic pipes. The jack or car lifting device produced according to the invention can be manufactured at relatively low cost, since the units can be made independently of one another, while the use of an hydraulic pump system in connection with an electric motor reduce the dimensions to a minimum. Furthermore, the units are assembled so as to dispense with a complicated system of conduits, whereby service troubles are practically excluded. A feature of special importance is the construction of the set of telescopic pipes in conjunction with the arrangement of the supply ducts for the telescopic space. As the pressure piping of the pump system connects with a vertical annular space into which opens a horizontal annular space, the ducts require only a minimum of space, which helps to keep down the overall height of the entire device. This feature is particularly important, since modern car design favors a very low chassis, so that jacks must be of a type that permits of being placed under the axles of a vehicle with the least trouble. The lifting device according to the invention is particularly suited for jacking vehicles on slippery or ice-covered roads, as the unpleasant preparatory work required in case of ordinary jacks is eliminated, and the device on being put under the axle will act immediately after the electric connection is made.

Although electrical and electro-hydraulic lifting devices of this class are known already, they are rarely used for the reason that they lack the real operating features which cover handiness, low cost, simple construction, low overall height, and operation free from trouble.

By way of example, two embodiments of the invention are illustrated in the accompanying drawings, in which Figure 1 is a section of one embodiment, the pumps being driven by an electric motor, the section being taken substantially on the line 1—1 of Figure 2; Fig. 2 is a plan view of the jack; Fig. 3 is a detail horizontal sectional view taken substantially on the line 3—3 of Fig. 1; Fig. 4 is a sectional view of another embodiment, in which the pumps are operated by electromagnets; Fig. 5, a sectional view of the pumps on an enlarged scale; Fig. 6, a further view of the pumps shown in Fig. 5.

Referring to the drawings, and first to Figs. 1, 2 and 3, the device comprises three units, viz. the electric motor 1, the pump body 2, and the carrier 3 for the telescopic pipes. The carrier 3 consists in the main of the casing 4 and the base plate 5. In the casing 4 a guide sleeve or bushing 6 is inserted. Between the casing 4 and the bushing 6 enters an annular projection 7 of the base plate 5 which may be connected with the casing 4 and the guide sleeve 6 by means of screws or casting. The casing 4 connects with the casing 8 in which the electric motor 1 and the pump body 2 are disposed. The motor 1 is supplied with power by a battery or the public supply by means of the connections 9. The shaft 10 of the motor 1, by means of the worm gear 11, 12, and the shaft 13, by means of the cams 14, drive the pump pistons 15, 16, the axial motion of which causes oil to be drawn in through the conduits 17, 18 and the suction valves 19, 20. The oil then passes through the delivery valves 21, 22 into the pressure duct 23 and thence into the vertical annular space 24 whence it overflows into the horizontal annular space 25 and thus enters the space 26 of the telescopic pipes. Within the bushing 6 moves the telescopic pipe 27 packed by means of the rings 28 and 29 and containing the movable telescopic pipe 30 which is packed relative to its guides by the rings 31 and 32. In the pipe 27 a return duct 33 is provided connecting with the ducts 34 and 35 through which the return oil flows into the pump space, the ducts being dimensioned so as to insure continuous running of the pumps even when the telescopic pipes are extended and without causing dangerous pressures to develop.

Alongside of the plungers 15 and 16 is a pressure plunger 15'. This plunger 15' is actuated from the cams 14 and the plunger chamber communicates with the duct 23 and functions to increase the pressure in the duct after the oil has been forced therein by the plungers 15 and 16.

The construction shown in Figs. 4, 5 and 6 also comprises 3 main parts, viz. the carrier 36 for the telescopic pipes, the pump body 37, and the electric magnets 38, the magnets 38 being supplied with current through the connection 39 either by a battery or a public supply and controlled by the switches 40, 41. The carrier 36 is constructed as shown in Fig. 1. In this embodiment, the electric motor is supplanted by electromagnets which act directly on the pump bodies 42 and 43. The pistons 42 and 43 draw in oil through the ducts 44 controlled by them. There are no suction valves. From the pump space the oil is conveyed into the joint pressure piping 47 through the delivery valves 45, 46, the piping 47 connecting with the vertical annular channel 48 and the horizontal annular channel 49 whence the pressure fluid enters the space 50 of the telescopic pipes. Draining of the oil and relief of the jack can be effected by means of the manually operated draining device 51, 52, as shown in Figs. 1 and 4.

The invention is not restricted to the embodiments shown and described, and alterations in the constructions disclosed may be made without departing from the spirit of the invention.

We claim:—

An electro-hydraulic lift comprising a carrier casing including a side wall and a base plate, a second casing connected to the carrier casing and projecting laterally therefrom, a pump in said second casing, an electric driving motor for the pump, said pump including a pump block having valve control inlet and outlet ducts therein, a cylindrical bushing in the carrier casing, telescopic lifting members mounted in the bushing, the base plate having an annular upstanding projection fitted between the side wall of the carrier casing and the bushing defining therewith an annular oil space, the base plate having cavities connecting the oil space with the interior of the bushing, the outlet duct of the pump block communicating with the annular space.

HEINRICH KRÄMER.
WILLI SCHUMACHER.
ERNST WEISSER.